(12) United States Patent
Vandenberg et al.

(10) Patent No.: US 11,599,647 B1
(45) Date of Patent: Mar. 7, 2023

(54) NETWORK NODE FOR SECURING PHYSICAL ITEMS USING CRYPTOGRAHIC DATA STRUCTURES

(71) Applicant: Collectible Holdings Inc., Santa Monica, CA (US)

(72) Inventors: Evan Vandenberg, Santa Monica, CA (US); Till Mueller, Santa Monica, CA (US)

(73) Assignee: Collectible Holdings, Inc., Santa Monica, CA (US)

( * ) Notice: Subject to any disclaimer, the term of this patent is extended or adjusted under 35 U.S.C. 154(b) by 0 days.

(21) Appl. No.: 17/855,514

(22) Filed: Jun. 30, 2022

Related U.S. Application Data

(63) Continuation-in-part of application No. 17/387,768, filed on Jul. 28, 2021, now abandoned.

(51) Int. Cl.
*H04L 29/06* (2006.01)
*G06F 21/60* (2013.01)
*H04L 9/00* (2022.01)

(52) U.S. Cl.
CPC .............. *G06F 21/602* (2013.01); *H04L 9/50* (2022.05)

(58) Field of Classification Search
CPC .................................. G06F 21/602; H04L 9/50
See application file for complete search history.

(56) References Cited

U.S. PATENT DOCUMENTS

| | | | |
|---|---|---|---|
| 2004/0107125 A1* | 6/2004 | Guheen ................... | G06Q 99/00 705/319 |
| 2020/0117690 A1* | 4/2020 | Tran ................... | G06F 16/90332 |
| 2020/0351089 A1* | 11/2020 | Wentz ................... | G06Q 20/401 |
| 2021/0133737 A1* | 5/2021 | Kinney ................. | H04W 12/06 |

* cited by examiner

*Primary Examiner* — Joseph P Hirl
*Assistant Examiner* — Leynna Truvan
(74) *Attorney, Agent, or Firm* — Scale LLP

(57) ABSTRACT

In some embodiments, a network node for securing physical assets may be provided. The network node may include a processor and a memory storing instructions. The network may be configured to: receive, from a first entity, a cryptographic data structure configured to identify a physical item stored in a secured location; in response to receiving the cryptographic data structure, generate and transmit to the first entity a plurality of fungible cryptographic items; secure the cryptographic data structure on a public data structure, such that the cryptographic data structure cannot be released unless the plurality of fungible cryptographic items are received; receive, from a second entity, the plurality of fungible cryptographic items; and in response to receiving the plurality of fungible cryptographic items, transmit to the second entity the cryptographic data structure.

7 Claims, 8 Drawing Sheets

NETWORK NODE FOR SECURING PHYSICAL ITEMS USING CRYPTOGRAHIC DATA STRUCTURES

CROSS-REFERENCE TO RELATED APPLICATION(S)

This application is a continuation-in-part of U.S. application Ser. No. 17/387,768, filed Jul. 28, 2021, which is incorporated by reference.

FIELD OF THE DISCLOSURE

This disclosure relates to systems and methods for securing physical items using cryptographic data structures.

BACKGROUND

Physical items can be held in safe deposit boxes or in other custodial relationships. However, the entity that controls the physical item generally cannot be verified by third parties. Further, there is no adequate mechanism for control of the physical to be fractionally transferred.

Accordingly, there is a need for systems and methods that allow physical items to be securely stored, registered in a decentralized ledger, and for fractionalized control of the physical item to be transferrable while the physical item remains securely stored.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, a network node for securing physical assets may be provided. The network node may include a processor and a memory storing instructions. The network may be configured to: receive, from a first entity, a cryptographic data structure configured to identify a physical item stored in a secured location; in response to receiving the cryptographic data structure, generate and transmit to the first entity a plurality of fungible cryptographic items; secure the cryptographic data structure on a public data structure, such that the cryptographic data structure cannot be released unless the plurality of fungible cryptographic items are received; receive, from a second entity, the plurality of fungible cryptographic items; and in response to receiving the plurality of fungible cryptographic items, transmit to the second entity the cryptographic data structure.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

In some embodiments, a distributed ledger and/or smart contract system may be provided which allows for control of an item to be fractionalized and recorded without centralized management of an underlying item. This may be achieved, for example, by: 1) recording control on a distributed ledger which is not proprietary to the seller of the product; 2) fractionalizing control using a smart contract deployed to the distributed ledger; and 3) allowing for re-consolidation of control in a single owner through interaction with the smart contract. By eschewing centralized management, it may be possible to provide for fractionalized, tradeable interests in items without necessitating substantial regulatory compliance expenditures.

Figure 1:
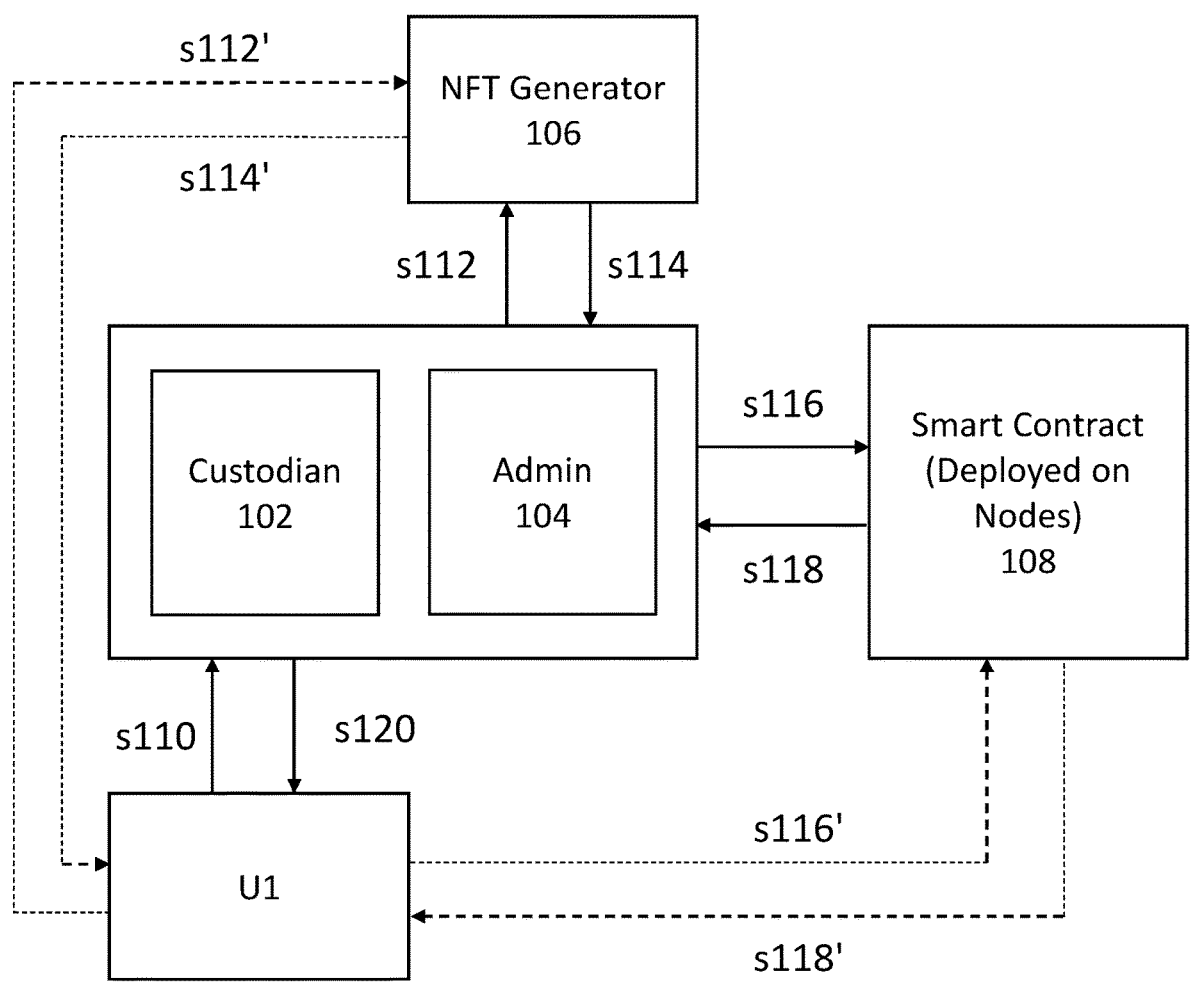
FIG. 1 shows an exemplary system for securing physical items using cryptographic data structures.

FIG. 1 shows an exemplary system for generating fractionalized interests in a physical item. In this system, a user U1 may interact with one or more of a custodian 102, an administrator 104, a cryptographic data structure generator 106, and a smart contract 108. In some embodiments, custodian 102 may be an entity that operates one or more physical facilities in which items may be deposited and securely stored. In some embodiments, administrator 104 may be an entity that facilitates the systems and processes described herein, e.g., by coordinating transactions between users, custodians, cryptographic data structure generators, smart contracts, and other relevant entities. The administrator 104 may provide one or more servers, which may receive and transmit messages to perform the functions described herein. In some embodiments, cryptographic data structure generator 106 may be an entity or module configured to receive information and generate cryptographic data structures containing that information. In any of the embodiments described herein, the cryptographic data structures may be non-fungible tokens. As used herein, references to a cryptographic data structure containing information include cases where the information is stored in the cryptographic data structure itself, as well as cases in which the cryptographic data structure includes a pointer or reference to the information. In some embodiments, smart contract 108 may be software configured to perform programmed tasks. In some embodiments, smart contract 108 may be stored on a decentralized ledger, such as a blockchain. For example, a smart contract 108 may be programmed and uploaded to a decentralized ledger and then stored in memory at one or more nodes or host computers that maintain and interact with the decentralized ledger.

In step s110, a user U1 may deposit a physical item with a custodian 102. The user U1 may also transmit payment, which, in some embodiments, may be in the form of a cryptocurrency. This payment may, in some embodiments, be a one-time payment to cover indefinitely the costs associated with custody. The user U1 may also transmit information indicating a digital wallet or account in which the user U1 wishes to receive fractionalized interests corresponding to the deposited physical item. In some embodiments, the deposit to the custodian 102 may be made indirectly by way of a third party, such as via an administrator 104 or a rating entity. The custodian 102 may hold the physical item, e.g., in a lockbox, and may release the physical item only when a user presents appropriate credentials (e.g., a nonfungible token (NFT) corresponding to the item) to recover the physical item. The custodian 102 may collect information related to the physical item. For example, the custodian 102 may collect information regarding the type of item, its condition, the identity of an entity that authenticated or rated the item, or any other information that may be considered material. This information may be collected from the user U1, by analyzing the item, or from a third party with knowledge of the item, such as a verification or rating entity that has previously analyzed the item.

The collected information may then be used to generate a cryptographic data structure that is specific to the physical item. In some embodiments, the custodian 102 may transmit the information directly to a cryptographic data structure generator 106. In other embodiments, the custodian 102 may be associated with an administrating entity 104, which may coordinate actions between users, custodians, cryptographic data structure generators, and smart contracts. In some embodiments, the administrator 104 may maintain a contract with the custodian 102 specifying terms under which the custodian 102 will hold and release physical items. For example, the custodian 102 may enter an agreement with the administrator 104 or a user specifying a fee to be paid in exchange for taking custody of the physical item on an indefinite, fixed time period, or lifetime basis. In some embodiments, the administrator 104 may also administer an exchange for trading fractionalized interests, as described below with respect to FIG. 3.

In step s112, information relating to a physical item may be transmitted to a cryptographic data structure generator 106. The information may be transmitted by the custodian 102 or by administrator 104 or smart contract 108 (which may first receive the information from the custodian 102, from the user U1, or from a verification/rating entity). Also in step s112, payment for generating the cryptographic data structure may be transmitted to the cryptographic data structure generator 106. In some embodiments, the user U1 may supply this payment. For example, the payment for generating the cryptographic data structure may be provided directly by user U1, or the payment may be supplied indirectly by U1, such as by collecting a broader fee for holding the physical item in custody and generating fractionalized interests and by using a portion of that fee to generate the cryptographic data structure. Such fee handling may be performed by the custodian 102, administrator 104, the smart contract 108, or other appropriate entity.

In step s114, cryptographic data structure generator 106 may generate and return a cryptographic data structure that is specific to the physical item received by custodian 102. For example, the information related to the physical item may be stored in the cryptographic data structure or otherwise associated with the cryptographic data structure. In the case of a trading card, for example, the cryptographic data structure may contain information indicating one or more of the type of card, the player, its date or edition, its quality or condition, and an entity that verified or evaluated any of the above. The cryptographic data structure may also contain information related to the custodian holding the physical item or an administrator involved in the process of generating the cryptographic data structure and/or fractionalized interests in the physical item.

In some embodiments, a user U1 may instead interact, directly or indirectly, with the cryptographic data structure generator 106 as shown in alternative steps s112' and s114'. For example, before or after an item is deposited with custodian 102, user U1 may transmit a message in step s112' to cryptographic data structure generator 106 providing the information needed to generate a cryptographic data structure for the deposited item. In some embodiments, user U1 may first deposit the item with the custodian 102 and receive from the custodian 102 a unique identifier corresponding to the deposited item. This exchange may occur, for example, in step s110. In some embodiments, user U1 may alternatively or additionally receive a credential, such as a cryptographic key, that the user U1 must submit to cryptographic data structure generator 106 to obtain a valid cryptographic data structure that can be later be presented to the custodian 102 to recover the deposited item. In some embodiments, the user U1 may submit the identifier and/or credential to the cryptographic data structure generator 106 with information related to the item in step s112'. In alternative step s114', the cryptographic data structure generator 106 may transmit the cryptographic data structure to the user U1.

In step s116, the cryptographic data structure may be transmitted to a smart contract 108. The cryptographic data structure may be transmitted by custodian 102, administrator 104, or by cryptographic data structure generator 106. In some embodiments, payment may also be submitted to the smart contract 108 in step s116. In some embodiments, this payment may be provided directly by the user U1. In other embodiments, it may be taken from a fee collected by the custodian 102 or administrator 104, as described above. In some embodiments, the cryptographic data structure may be transmitted to the smart contract 108 by user U1, as shown in alternative step s116'. Payment may likewise be submitted by the user U1 directly to the smart contract 108.

The smart contract 108 may determine whether the cryptographic data structure conforms to specification requirements for generating fractionalized interests. For example, the smart contract 108 may determine whether the cryptographic data structure contains certain data categories for a type of physical item. If the smart contract 108 determines that the cryptographic data structure lacks the required properties, the cryptographic data structure may be rejected. If the smart contract 108 determines that the cryptographic data structure has the required properties, the smart contract 108 may accept the cryptographic data structure and hold the cryptographic data structure in a digital wallet or at a digital address associated with the smart contract 108.

The smart contract 108 may generate a plurality of tokens that are associated with the cryptographic data structure. In some embodiments, each token may contain information indicating the cryptographic data structure with which it is associated. In some embodiments, each token may contain information indicating the data related to the physical item. In step s118, the generated tokens may be transmitted to the entity from which the cryptographic data structure was received. In some embodiments, the tokens may be transmitted by the smart contract 108 to the administrator 104 or custodian 102. In other embodiments, the tokens may be transmitted by the smart contract directly to the user U1 (as shown in alternative step s118'), or to the cryptographic data structure generator 106, which may transmit the tokens to the user U1 or to an intermediary such as custodian 102 or administrator 104. In some embodiments, allowing a user U1 to perform transactions directly, as shown in steps s112', s114', s116', and s118', may enhance the decentralized nature of the system, which may beneficially reduce regulatory complexity.

In step s120, the tokens corresponding to the physical item may be transmitted to the user U1. For example, the tokens may be transferred to a digital wallet or account controlled by the user U1. From end-to-end, the user U1 may thus deposit a physical item and, in return, receive a plurality of tokens representing fractionalized interests in that physical item. The physical item may be securely stored by the custodian until a user satisfies conditions required for release of the physical item. In some embodiments, the physical item may be released when a user demonstrates possession of, or transmits to the custodian or administrator, the cryptographic data structure associated with the physical item. The cryptographic data structure may be held by the smart contract 108 and released to a user only when the user transmits to the smart contract tokens representing a 100% interest in the physical item. Exemplary release conditions are described in greater detail below with respect to FIG. 5.

Figure 2:
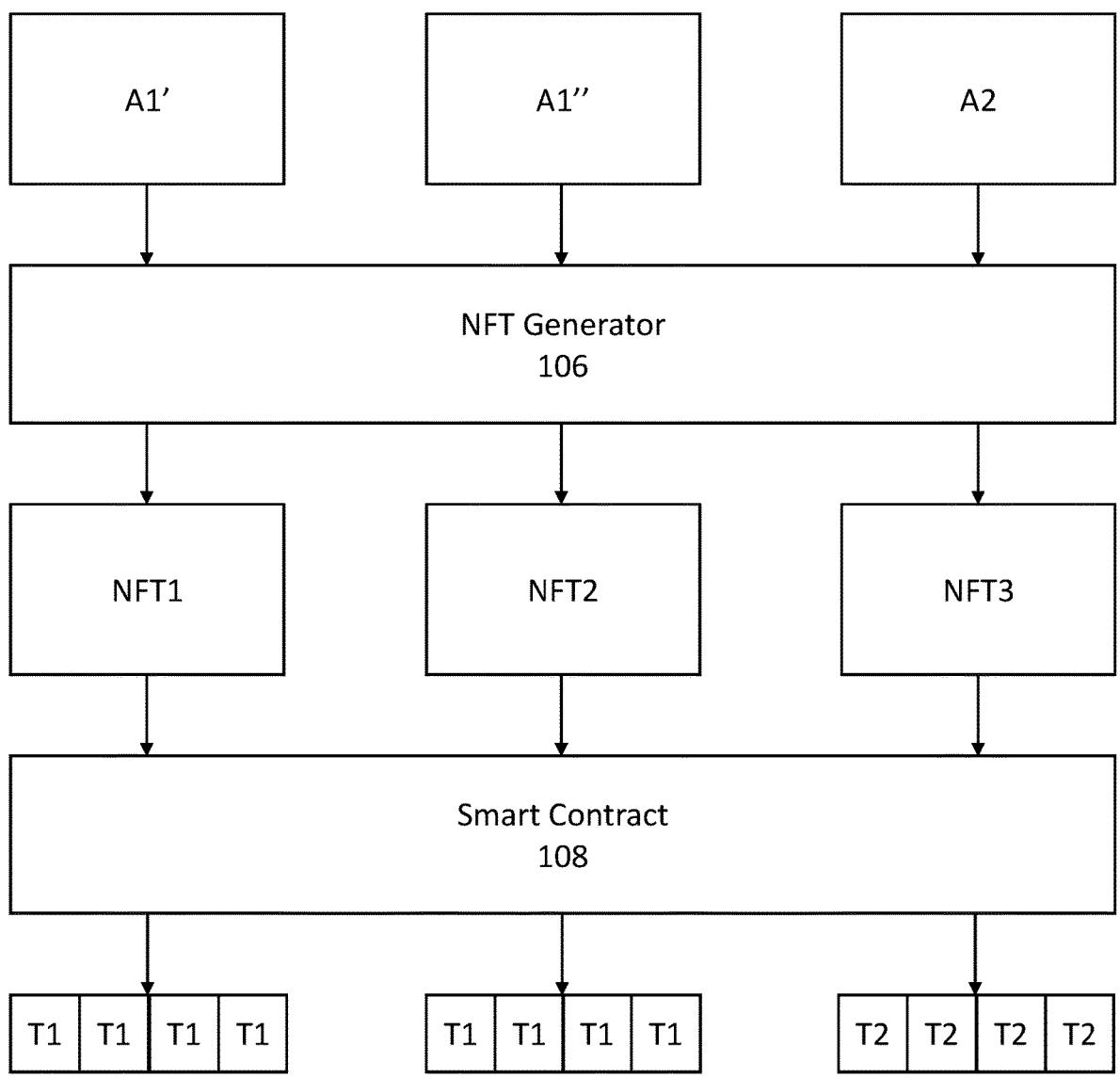
FIG. 2 shows an exemplary correspondence between items, cryptographic data structures, and tokens.

FIG. 2 shows an exemplary correspondence between physical items, cryptographic data structures, and tokens. As shown in FIG. 2, any number of physical items may be deposited with a custodian. The illustrated embodiment shows three items A1', A1", and A2. In this example, items A1' and A1" are two physically distinct items which are identical in terms of all of the data fields that will be collected by the system and stored in a cryptographic data structure corresponding to the items. A1' and A1" may thus be considered equivalent items. Asset A2 is different, in one or more of these data fields, than items A1' and A1".

The data for each of items A1', A1", and A2 may be passed through cryptographic data structure generator 106, which may output nonfungible tokens NFT1, NFT2, and NFT3. Each NFT may be unique, but NFT1 and NFT2 may store identical physical item data. NFT3 may store physical item data that is different, in one or more data fields, from that stored in NFT1 and NFT2. The NFTs may be transmitted to smart contract 108, which may output a plurality of tokens corresponding to the NFTs and physical items. In some embodiments, the smart contract may determine that NFT1 and NFT2 contain identical physical item data, and generate identical tokens or tokens of the same category which correspond equally and may be redeemable for either NFT1 or NFT2 and, in turn, either item A1' or item A1". In some embodiments, the smart contract 108 may first receive NFT1, issue a first plurality of tokens T1 corresponding to NFT1, and then receive NFT2. The smart contract 108 may determine whether an NFT with identical physical item data has been previously received and, if so, issue a second plurality tokens T1 that are identical to the first plurality of tokens. Similarly, when NFT3 is received, the smart contract 108 may determine that no NFT with identical item data has been previously received and, as a result, issue a third plurality of tokens T2, which may be of a different category than tokens T1 and which may not be redeemable for NFTs NFT1 or NFT2.

Any number of tokens T1, T2 may be generated. Assuming, by way of example, that one hundred tokens are generated, each token may represent a 1% interest in the physical item. If a user held all one hundred tokens (i.e., 100%), the user may have the option to transmit the tokens to the smart contract and receive the corresponding NFT in return. In a case where two NFTs with identical item data are received by the smart contract, there may be a total of two hundred tokens (again assuming one hundred tokens per NFT). A user holding one hundred tokens (i.e., representing a 100% interest in one of these two NFTs) may have the option to transmit the one hundred tokens to the smart contract and receive one of the corresponding NFTs in return. A second user may later transmit the second one hundred tokens to the smart contract and receive the other of the corresponding NFTs in return. The number of tokens generated per NFT may be chosen arbitrarily. For example, one thousand, ten thousand, one hundred thousand, or one million tokens may be generated per NFT. In each such case, the smart contract may allow users to redeem collections of 100% of the outstanding tokens per NFT to obtain the NFT. In some embodiments, the smart contract may store and update data as to the number of tokens outstanding and the control of the tokens.

Figure 3:
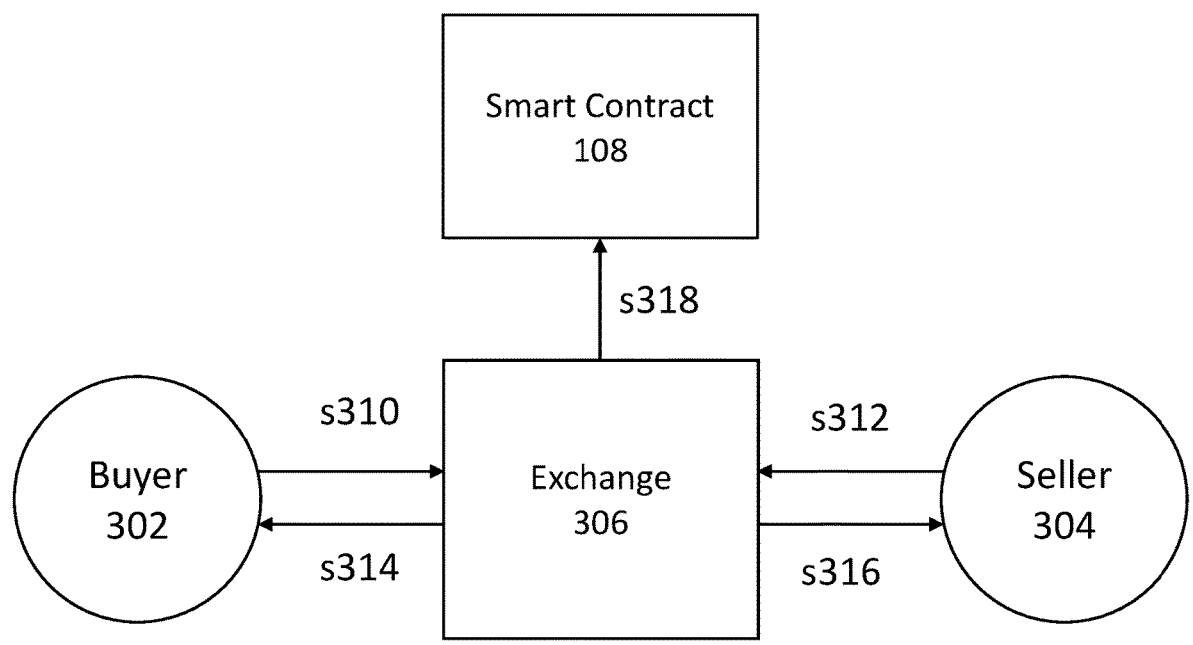
FIG. 3 shows an exemplary exchange for transferring control of tokens representing fractionalized interests in items.

FIG. 3 shows an exemplary exchange for transferring control of tokens representing fractionalized interests in physical items. The exchange 306 may interact with a plurality of users, which may include a plurality of buyers 302 and sellers 304. In the illustrated example, one buyer and seller are shown, but any number of buyers and sellers may interact with the exchange. The exchange may also interact with a smart contract 108, which may manage issuance, redemption, and track control of tokens, as described above with respect to FIGS. 1 and 2.

In step s310, buyer 302 may submit an offer to buy one or more tokens representing fractionalized interests in a physical item. In step s312, a seller 304, who may control one or more such tokens, may submit an offer to sell the tokens. The exchange 306 may receive a plurality of such buy and sell offers, and where a buy and sell offer are matched, may execute a trade. In step s314, the exchange may notify the buyer that a trade has been executed at the offered price. In step 316, the exchange may notify the seller that a trade has been executed at the offered price. In some embodiments, the exchange may deduct the price from an account held by the buyer (or otherwise collect payment) and transfer the price (optionally, less an exchange fee) to an account held by the seller. Ownership of the tokens may likewise be transferred from the seller to the buyer. In some embodiments, the exchange may take custody of the tokens and maintain internal ledgers indicating control of each token. In such embodiments, control of tokens may be transferred from one user by updating ledgers internal to the exchange. In other embodiments, the tokens may be transferred to accounts external to the exchange. In optional step s318, the exchange may notify the smart contract 108 when a transaction occurs. In some embodiments, the smart contract may then update records regarding token control.

Figure 4:
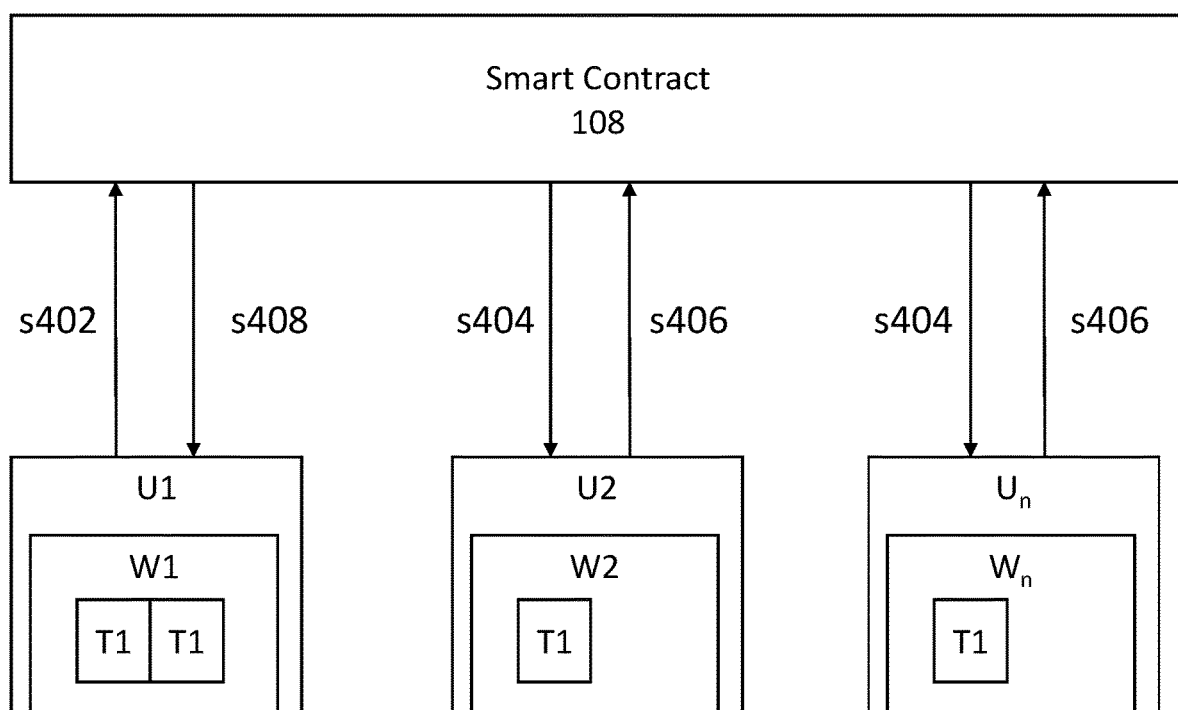
FIG. 4 shows an exemplary buy-out process.

FIG. 4 shows an exemplary buy-out process. In some embodiments, tokens T1 representing fractionalized interests in a physical item may be held by any number of users U1, U2, U$_n$. To provide a simplified example, user U1 is shown holding two tokens T1 in a wallet W1 controlled by user U1, user U2 is shown holding one token T1 in a wallet W2 controlled by user U2, and user U$_n$ is shown holding one token T1 in a wallet W$_n$ controlled by user U$_n$. In a typical scenario, many more tokens may be distributed across many more users. The smart contract 108 may be configured to enable users to initiate a buy-out procedure. Such a buy-out procedure may advantageously mitigate or eliminate collective action problems. For example, without a buy-out procedure, users may have an incentive to hold a small interest in a physical item so that if another user wishes to redeem the fractionalized interests for the item, they will first need to buy the remaining fractionalized interest from the holdout user, allowing the holdout user to demand an unduly high price. The use of a buy-out procedure, such as that described herein, may prevent such holdouts.

In step s402, user U1 may initiate a buyout procedure. For example, user U1 may transmit a buyout offer to obtain a number N of the tokens T1, where the number N is a number of tokens necessary to redeem the tokens for a corresponding cryptographic data structure held by the smart contract (which, in turn, may be redeemed for a physical item held by a custodian). In this case, obtaining N tokens refers to the total number of tokens the user would hold if the buyout offer is executed. For example, in the illustrated example, there are a total of four tokens T1 outstanding, which, if they were held by a single user, would be sufficient to be redeemed for a corresponding cryptographic data structure. Thus, N is four, and user U1's offer is to obtain a total of four tokens (in this case, by increasing user U1's stake from two to four tokens).

The buyout offer transmitted in step s402 may indicate a stake value of the P tokens held by the buyout user. For example, in the illustrated example, P is two, and the buyer may assign some monetary value to the P tokens being staked under the buyout procedure. In some embodiments, the buyout offer transmitted in step s402 may include a buyout price at which the buyout user U1 is willing to obtain N tokens (e.g., by buying sufficient tokens from users $U_2, U_n$ such that user U1 will hold N tokens if the transaction is completed). In some embodiments, the buyout user U1 may be required to submit with the buyout offer a payment equal to the buyout price. The smart contract 108 may hold this payment during a buyout period, and if the buyout offer is successful, the smart contract 108 may use the payment to transmit the tokens from users $U_2, U_n$. If the buyout offer is not successful, the payment may be returned by the smart contract to user U1. In some embodiments, the stake value P may be implied from the buyout price. Submitting a buyout price to obtain N tokens may thus be considered to indicate a stake value of the P tokens held by the buyout user.

In some embodiments, user U1 may also transmit a transaction fee to the smart contract to initiate the buyout procedure.

Upon receipt of the buyout offer in step s402, the smart contract may in step s404 notify other users $U_2, U_n$ holding token type T1 of user U1's initiated buyout and the stake value of the P tokens. Optionally, users who do not hold token type T1 may not be notified. The smart contract 108 may initiate a time period during which the other users may submit offer to obtain the P tokens at the stake value. In some embodiments, the time period may be any of 6 hours, 12 hours, 1 day, 2 days, 3 days, 5 days, 1 week, or 2 weeks.

In step s406, each user $U_2, U_n$ may transmit either an offer to obtain the P tokens at the stake value or a refusal to do so. If the allotted time expires, the smart contract 108 may interpret a lack of response as a refusal. In step s408, the buyout transaction may be settled. If one of the users $U_2, U_n$ elected to obtain the P tokens at the stake value, control of the P tokens may be transferred to that user, and payment may be transferred to the buyout user U1. If all users decline to obtain the P tokens at the stake value or fail to respond within the allotted time period, user U1's buyout may be deemed successful, and tokens T1 may be transferred from the other users $U_2, U_n$ in a quantity sufficient such that user U1 will have N tokens (i.e., the amount necessary to obtain the cryptographic data structure and physical item). Payment may be transferred from U1 to the users $U_2, U_n$ in an amount implied by the stake value of the P tokens. For example, since the P tokens represent a known share of the N tokens, the stake value for the P tokens implies a corresponding value of the N tokens, which may then be paid to the users $U_2, U_n$ on a pro rata basis depending on the number of tokens obtained from each respective user. In some embodiments, a buyout price staked by the buyout user U1 and held by the smart contract may be paid to the users $U_2, U_n$ on a pro rata basis depending on the number of tokens obtained from each respective user.

Figure 5:
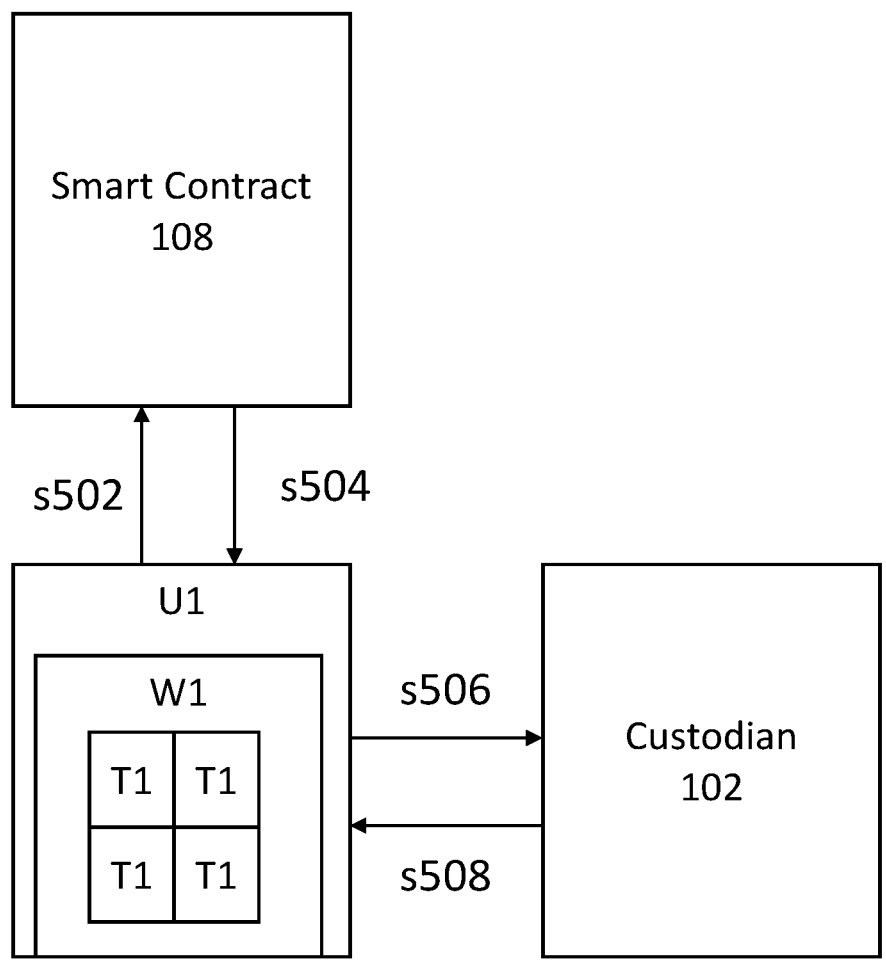
FIG. 5 shows an exemplary process for redeeming tokens to take possession of a physical item.

FIG. 5 shows an exemplary process for redeeming tokens T1 to take possession of a physical item. In the illustrated example, a user U1 controls a wallet W1 in which all tokens T1 corresponding to a cryptographic data structure and item. In step s502, the user may transmit the plurality of tokens T1 to smart contract 108. The smart contract may determine to which cryptographic data structure the tokens T1 are associated and, upon verification, transfer in step s504 the associated cryptographic data structure to user U1 (e.g., by assigning control of the cryptographic data structure to wallet W1). The smart contract 108 may burn (e.g., destroy) all of the tokens T1, since the tokens T1 no longer correspond to a cryptographic data structure held by the smart contract 108.

In step s506, the user U1 may transmit the cryptographic data structure to the custodian 102. In response, the custodian 102 may verify the cryptographic data structure and determine whether and to which physical item the cryptographic data structure corresponds. In response to receiving a valid cryptographic data structure corresponding to a physical item, the custodian 102 may release the physical item to the user U1, as shown in step s508. In some embodiments, depositing and/or withdrawing a physical item may be automated. For example, a facility may have a number of lockboxes in which the locks are internet-connected. Upon deposit of a physical item and activation of a lock, the lockbox transmit a message that initiates the process of generating a cryptographic data structure and fractionalized tokens as described above with respect to FIG. 1. Upon transmission of the cryptographic data structure to a lockbox, the lockbox may automatically unlock so that a user can recover the physical item. In other embodiments, a smart contract, administrator, or custodian may transmit access credentials, such as an access code, to a user and to a lockbox storing a physical item when the user redeems a cryptographic data structure or a plurality of tokens representing a 100% interest in the physical item. The user may then input the access credentials at the lockbox, and the lockbox may, upon validating that the credentials received from the user correspond to those received from the smart contract, administrator, or custodian, unlock to allow the user to take possession of the physical item.

Figure 6:
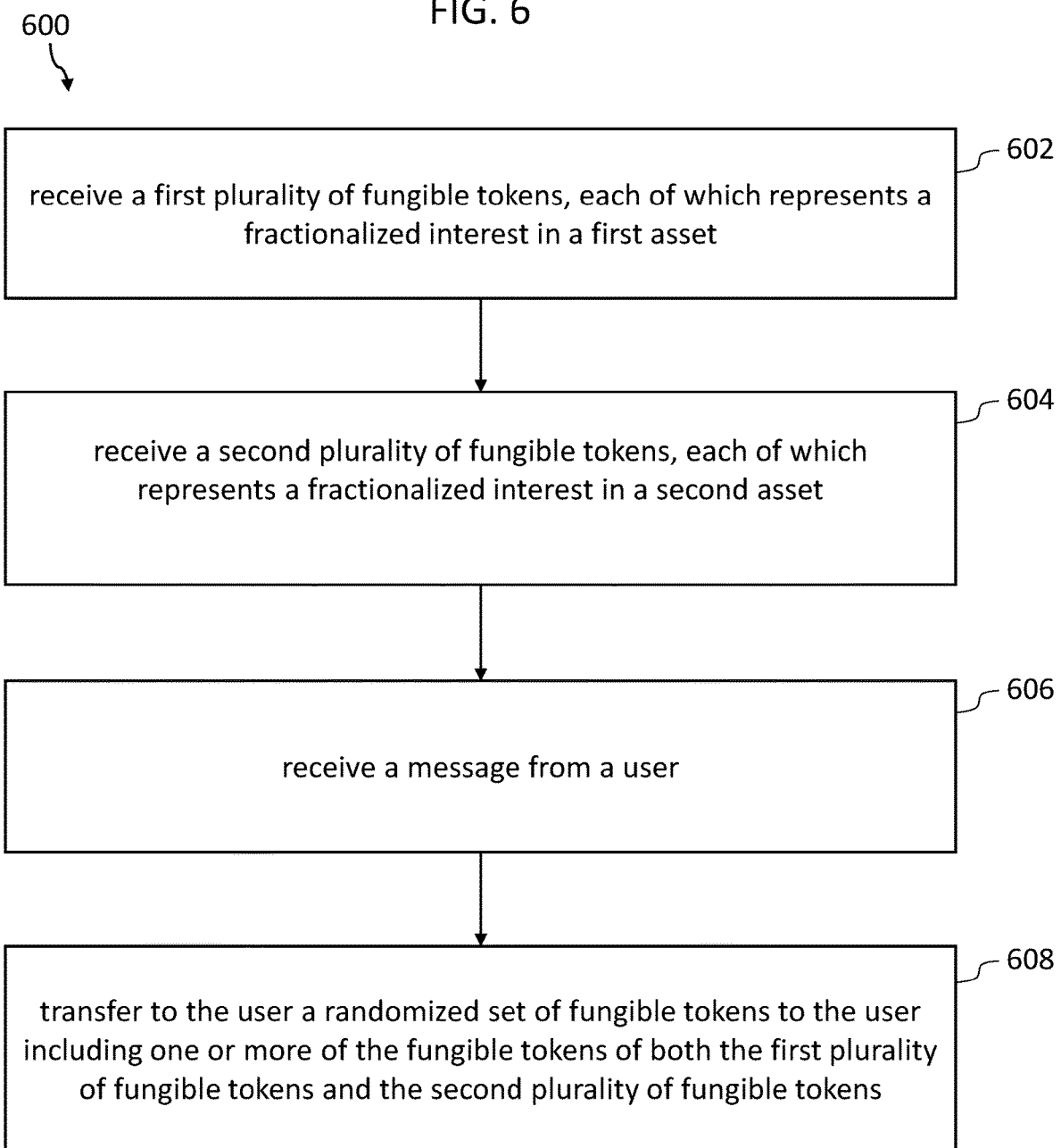
FIG. 6 is a flow chart which shows a method of distributing fractionalized interest in items.

FIG. 6 shows an exemplary method 600 by which a system may transfer fungible tokens into a randomized set of fungible tokens. In some embodiments, method 600 may be performed by an exchange, such as that described above with respect to FIG. 3. Method 600 may alternatively be performed by other entities, such as an administrator, custodian, or smart contract, as described above with respect to FIG. 1. In embodiments where method 600 is performed by a smart contract, a smart contract may be programmed to perform the steps as described herein and stored on a decentralized ledger. Optionally, the smart contract may communicate with another entity (e.g., an administrator, exchange, or other entity) that may supply random or pseudorandom values, which the smart contract may use to select tokens for inclusion in a set. The items used in method 600 may be any of the items described with respect to FIGS. 1-5, and method 600 may be combined with any of the systems and techniques described therein. In step 602, the system may receive a first plurality of fungible tokens, each of which represents a fractionalized interest in a first item. The first item may comprise a physical item that may be deposited with a custodian. In some embodiments, there may be a non-fungible token that corresponds to the first item. The non-fungible token may store physical data that identifies the first item. In other embodiments, the first item may be digital. For example, the non-fungible token itself may be the item of interest. In some embodiments, the first plurality of tokens may represent a fractionalized interest in the non-fungible token.

In step 604, the system may receive a second plurality of fungible tokens, each of which represents a fractionalized interest in a second item. The second item may represent a physical item deposited with a custodian. In some embodiments, there may be a non-fungible token that corresponds to the second item. The non-fungible token may store physical data that identifies the second item. In other embodiments, the second item may be a digital item (such as, but not limited to a non-fungible token). In some embodiments, the first plurality of tokens may represent a fractionalized interest in the non-fungible token. In some embodiments, the amount of fungible tokens comprising the second plurality of fungible tokens may be different than the amount of fungible tokens comprising the first plurality of fungible tokens.

In step 606, the system may receive a message from a user. In some embodiments, the message may comprise a request to obtain the item. In other embodiments, the message may transmit a payment, which in some embodiments, may be in the form of a cryptocurrency. In other embodiments, the message may indicate that the user has performed an action that triggers compensation or a reward. For example, the message may indicate that a user has made an initial deposit with the system or has registered a new item. The message may also transmit information indicating a digital wallet or account which the user wishes to receive the randomized set of fungible tokens.

In step 608, the randomized set may be transferred to the user. Step 608 may be performed in response to receipt of the message in step 606. In some embodiments, the randomized set may be transferred to the user via a smart contract. In some embodiments, the randomized set may be transferred to the digital wallet that may have been provided in the message from the user. The randomized set may comprise one or more of the fungible tokens of both the first plurality of fungible tokens and the second plurality of fungible tokens. In some embodiments, the set may be comprised of a different number of fungible tokens from the first plurality than from the second plurality.

Before transmitting to the user the randomized set of fungible tokens, the system may select tokens to include in the randomized set. In some embodiments, all items may have an equal probability of being included in the randomized set. In other embodiments, certain items may be more likely than others to be included in the randomized set, certain items may be excluded from inclusion in the randomized set, or randomized sets may be selected from a predesignated pool of eligible items. In some embodiments, a probability function may be used that weights items for inclusion in a randomized set based on a market value of each item. Optionally, the market value may be one among a plurality of factors that the probability function considers. Other factors may include whether the item is a physical item, a trading card, the player listed, the date the item was created, its condition, when the item was registered with an exchange system, trading volume for the item, or volatility for the item. In other embodiments, a system may define a pool of items from which randomized sets can be generated. In some embodiments, the pool may be defined based on market value of the items. In some embodiments, additional factors may be considered (e.g., whether the item is a physical item, a trading card, the player listed, the date the item was created, its condition, when the item was registered with an exchange system, trading volume for the item, or volatility for the item). The randomized set may include tokens corresponding to any number of items (e.g., 1, 2, 3, 4, 5, 10, 20, 50, or 100 items), and any number of randomized sets may be transmitted to a user in response to one or more messages received from the user.

Figure 7:
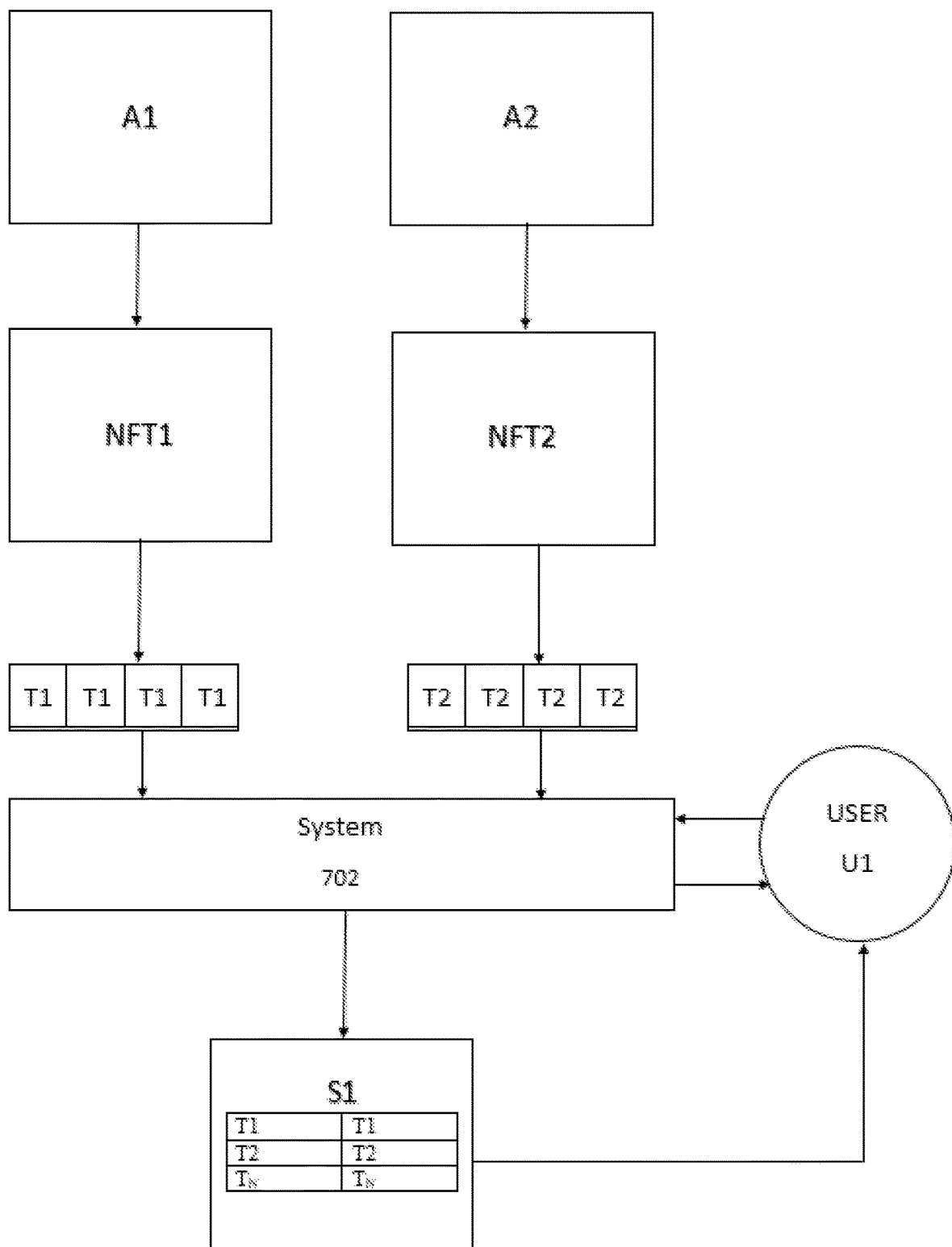
FIG. 7 shows exemplary correspondence between the system transferring a set of tokens and a user.

FIG. 7 shows exemplary correspondence between the system transferring the tokens and the user. Although two items are shown in FIG. 7, it should be understood that any number of items, cryptographic data structures, and tokens may be used. In this system, a user U1, may interact with a system 702. In some embodiments, the item A1 may be a physical item deposited with a custodian, and the item A2 may be a second physical item deposited with a custodian. In some embodiments, the non-fungible tokens NFT1 and NFT2 may be generated using a smart contract. A non-fungible token NFT1 may correspond to the item A1, and a non-fungible token NFT2 may correspond to the item A2.

In some embodiments, the item A1 may be the non-fungible token NFT1, and the second item A2 may be the second non-fungible token NFT2 (e.g., the NFTs themselves may be the items of value). In other embodiments, the NFTs may represent other types of digital items.

A plurality of fungible tokens T1 may correspond to NFT1, and a plurality of fungible tokens T2 may correspond to NFT2. In some embodiments, the amount of tokens comprising T1 may be different than the amount of tokens comprising T2. In some embodiments, the fungible tokens T1, T2 may be generated using a smart contract as described above with respect to FIGS. 1, 2, and 4.

The system 702 may comprise non-transitory computer readable medium and one or more processors. In some embodiments, the system may receive the plurality of tokens T1 and T2. In some embodiments, the system 702 may be an exchange or administrator, as described in FIGS. 1 and 3.

The system 702 may select some tokens from T1 and T2 for a randomized set of fungible tokens S1. In some embodiments, the selection of T1 and T2 may be based, at least partially, on the market value of the fungible tokens. In some embodiments, the system selects fungible tokens based on a market value of the fungible tokens. For example, the system may use a probability function that weights tokens for selection based on their market values. In some embodiments, fungible tokens may only be eligible for selection if the market value of the fungible tokens falls within a certain range. In some embodiments, the system may utilize a smart contract when selecting the tokens for S1. The amount of tokens T1 within the randomized set S1 may be different than the amount of coins T2 within the randomized set S1. Set S1 may also include tokens corresponding to any number of additional items and/or NFTs, as indicated by TN.

The system may receive a message from a user U1. In some embodiments, the message may comprise a purchase offer. In some embodiments, the message may transmit a payment, which in some embodiments, may be in the form of a cryptocurrency.

The message may also transmit information indicating a digital wallet or account that the user wishes to receive the randomized set of fungible tokens. In some embodiments, the user U1 may utilize a smart contract when sending the message to the system. In some embodiments, the system send a response message back to the user U1. In some embodiments, the response message may confirm that the system received the message from the user U1. In some embodiments, the response message may request that the user U1 confirm the information indicating the digital wallet or account provided in the message from the user U1. In some embodiments, the system may utilize a smart contract when sending the response message to the user U1.

In some embodiments, the system may transfer the set S1 to user User1 in response to receiving the message. In some embodiments, multiple sets may be transferred to the user in response to receiving the message. In some embodiments, the user may transmit multiple messages to the system, and the system may transmit one or more randomized sets in response to each of the received messages.

Figure 8:
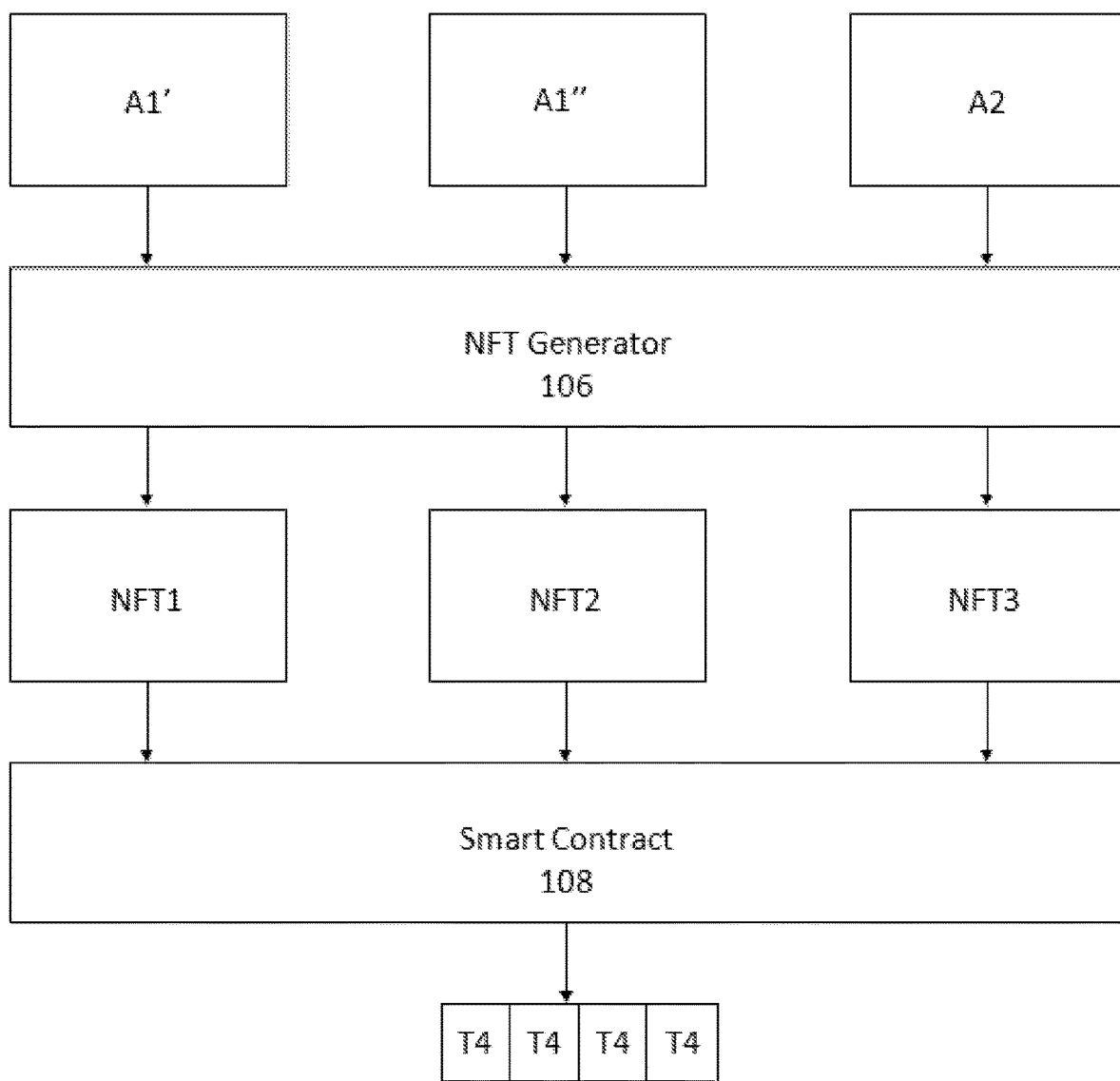
FIG. 8 shows an exemplary process for generating tokens representing a fractionalized interest in a collection of items

FIG. 8 shows an exemplary process for generating tokens representing a fractionalized control in a collection of items. As shown in FIG. 8, any number of physical or digital items may be used. In some embodiments, the items used may be physical items which may be deposited with a custodian. The illustrated embodiment shows three items A1', A1", and A2. In this example, items A1' and A1" are two physically distinct items which are identical in terms of all of the data fields that may be collected by the system and stored in a cryptographic data structure corresponding to the items. A1' and A1" may thus be considered equivalent items. Asset A2 is different, in one or more of these data fields, than items A1' and A1".

The data for each of items A1', A1", and A2 may be passed through cryptographic data structure generator 106, which may output non-fungible tokens NFT1, NFT2, and NFT3. Each NFT may be unique, but NFT1 and NFT2 may store identical physical item data. NFT3 may store physical item data that is different, in one or more data fields, from that stored in NFT1 and NFT2.

In other embodiments, the items may be entirely digital. For example, the NFTs (e.g., NFT1, NFT2, NFT3) may themselves be the items of value, and they may not correspond to any physical item. In other embodiments, some cryptographic data structures may correspond to physical items, and other cryptographic data structures may be or correspond to all-digital items. In the case of all digital items, the use of a cryptographic data structure generator may be omitted, as the cryptographic data structure (or other digital item) may pre-exist the use of the system.

In the illustrated embodiment, the cryptographic data structures may be transmitted to smart contract 108, which may output a plurality of tokens corresponding to the cryptographic data structures and physical items. In some embodiments, the smart contract may issue a plurality of tokens T4 which correspond to NFT1, NFT2, and NFT3 as a collection. Each token T4 may thus represent a fractional interest in a collection of multiple items. In a trading card example, a class of tokens may be generated that corresponds to a multiple trading cards for a given player, or for multiple trading cards for a rookie class for a given year. The "collection" tokens T4 may be used, exchanged, and redeemed in the same way as the fungible tokens described above with respect to FIGS. 1-5.

Any number of tokens T4 may be generated. Assuming, by way of example, that one hundred tokens are generated, each token may represent a 1% interest in the collection of physical items. If a user held all one hundred tokens (i.e., 100%), the user may have the option to submit the tokens in the smart contract and receive the corresponding collection of cryptographic data structures. The number of tokens generated per cryptographic data structure may be chosen arbitrarily. For example, one thousand, ten thousand, one hundred thousand, or one million tokens may be generated per collection of cryptographic data structures. In each such case, the smart contract may allow users to redeem collections of 100% of the outstanding tokens per collection of cryptographic data structures to obtain the cryptographic data structures within the collection of cryptographic data structures. In cases where the cryptographic data structures represent physical items, the user may then redeem the collection of cryptographic data structures to take possession of the corresponding collection physical items, using the process described above with respect to FIG. 5. The smart contract may store and update data as to the number of tokens outstanding and the control of the tokens.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A network node for security using cryptographic data structures, the network node comprising:
    a processor; and
    a memory storing instructions that, when executed by the processor, are configured to cause the network node to:
        receive, from a first entity, a cryptographic data structure configured to identify a physical item stored in a secured physical location that encloses the physical item, wherein the cryptographic data structure is a non-fungible token that stores one or more attributes describing the physical item;
        in response to receiving the cryptographic data structure, transmit to the first entity a plurality of fungible cryptographic items, wherein the plurality of fungible cryptographic items are fungible tokens that are associated with the non-fungible token and the physical item, and the fungible tokens are configured to be held and transferred between different entities and, when held by a single entity, collectively represent a right of access to the physical item;
        secure the cryptographic data structure on a public data structure, the public data structure being a distributed ledger in a decentralized network, such that the cryptographic data structure cannot be released from the public data structure unless the plurality of fungible cryptographic items are received;
        receive, from a second entity that is different from the first entity, the plurality of fungible cryptographic items after the second entity obtained the plurality of fungible cryptographic items from one or more of the different entities; and in response to receiving the plurality of fungible cryptographic items, transmit to the second entity the cryptographic data structure, the cryptographic data structure being configured to be used by the second entity as a security credential to retrieve the physical item from the secured physical location enclosing the physical item.

2. The network node of claim 1, wherein the physical item is a trading card.

3. The network node of claim 1, wherein the secured physical location is an internet-connected lockbox, and the internet-connected lockbox is configured to:

upon receipt of the cryptographic data structure at the internet-connected lockbox, automatically unlock the internet-connected lockbox so that a user can recover the physical item.

4. The network node of claim 1, wherein the network node is further configured to:

in response to receiving, from the second entity, the plurality of fungible cryptographic items, destroy the plurality of fungible cryptographic items.

5. The network node of claim 1, wherein the plurality of fungible cryptographic items are held by a plurality of different entities before the second entity transmits the plurality of fungible cryptographic items to the network node.

6. The network node of claim 5, wherein the plurality of different entities comprises at least three entities, and each of the at least three entities holds at least one or more fungible tokens of the plurality of fungible cryptographic items.

7. The network node of claim 1, wherein the secured physical location is at a facility of a custodian, and the one or more attributes stored in the non-fungible token and describing the physical item are specified by the custodian.

* * * * *